UNITED STATES PATENT OFFICE.

KAZUTA KISHI, OF TOKYO, JAPAN.

PROCESS FOR PRODUCING ARTIFICIAL SILK.

1,231,172. Specification of Letters Patent. Patented June 26, 1917.

No Drawing. Application filed June 24, 1914. Serial No. 847,142.

*To all whom it may concern:*

Be it known that I, KAZUTA KISHI, M. D., a subject of the Emperor of Japan, residing at No. 51 Akashicho, Kiobashi-ku, city of Tokyo, Empire of Japan, have invented a new and useful Process for Producing Artificial Silk, of which the following is a specification.

This invention has reference to an improved process of producing artificial silk which consists in employing, as an additional and essential element of the known process, an improving agent or oil which is specially prepared from the ordinary commercial "chrysalis-oil" to be admixed with the usual solution of nitro-cellulose made from the bast of mulberry, or for instance paper-mulberry, so that it does not lose its luster and strength by washing, even in hot water, while at the same time its tenacity is increased, it may be dyed to any color with great facility, and its general appearance is much the same as that of natural silk.

According to this invention the bast or cellular tissue of mulberry, or paper-mulberry is first bleached in a suitable manner, then after drying thoroughly, is soaked in a mixed solution of sulfuric and nitric acids in the proportions generally used in the manufacture of collodion, and allowed to stand for about one hour in a closed vessel. The material is then taken out of the vessel and washed repeatedly for several times, and dried. This will produce the required nitrocellulose for treatment.

The nitro-cellulose thus obtained is then dissolved in the mixed solution of alcohol and ether, in the following proportions:

| | |
|---|---|
| Nitro-cellulose | 100 parts by weight. |
| Alcohol | 50 parts by weight. |
| Ether | 50 parts by weight. |

To the above solution is added a specially prepared oil, which I obtain by refining a commercial chrysalis-oil. In the employment of such oil, I have found that, it not only greatly improves the luster of the goods manufactured but at the same time has the advantage of increasing its viscoidal character.

Great importance is attached to the use of this specially prepared chrysalis-oil, as without it no such advantage can be obtained.

The proportion of this oil to the solution varies according to the nature of the cellulose used. Where the cellulose of mulberry is used, the most preferable amount of the chrysalis-oil will be 3%, while with the paper-mulberry 4% is sufficient.

It being understood, however, that the chrysalis-oil above referred to is entirely different from those which are found in the market, and may be obtained by first subjecting such commercial chrysalis-oil to a refining process in which it is freed from all the volatile matters present. This will be readilly effected by gently heating, in a suitable manner, until it is reduced to ¾ of its original quantity.

The separation of the said chrysalis oil is preferably conducted as follows: After the silk has been unwound from the cocoon in the usual manner, the pupæ obtained are dried in the sun until the greater part of the moisture has evaporated. The dried pupæ are then gathered and pressed until a very thick adhesive liquid is given off.

The liquid obtained emits quite an offensive smell, which must be removed by evaporation.

After the liquid has been evaporated to a point where the odor has been removed, it is treated by mixing with finely ground Kambara clay, said clay being a species of clay earth produced in the district of Kambara, Empire of Japan. The mixture of clay powder and liquid then will be boiled at a temperature of approximately 200° F., the mixture being agitated during the operation of boiling and then left to settle. After settling, the liquid above the precipitated clay powder is decanted and filtered. The filtered liquid thus obtained is the chrysalis oil used in my process as above mentioned.

The solution thus prepared will be then drawn out through capillary tubes, under 20 atmospheres pressure, and washed preferably in the mixed solution of distilled water, alcohol, hydrochloric acid, and saturated solution of potassium sulfate, and when dried will produce artificial silk required.

Having now described my invention, I declare that what I claim is:—

1. The process of producing artificial silk, which consists in first bleaching the cellulose of the mulberry, or paper mulberry, drying thoroughly and subsequently nitrating in a mixed solution of sulfuric and nitric acids, dissolving in alcohol and ether, and subsequently adding thereto non-volatile chrysalis-oil, and forcing out, under pressure, through a capillary tube, into a fine filament, washing in a suitable manner and drying, substantially as set forth.

2. The process of producing artificial silk which consists in first bleaching the cellulose of the mulberry, or paper mulberry, drying thoroughly and subsequently soaking in a mixed solution of sulfuric and nitric acids, dissolving in alcohol and ether, and subsequently adding thereto non-volatile chrysalis oil, forcing out under pressure through a capillary tube into a fine filament and washing in a mixed solution of distilled water, alcohol, hydrochloric acid, and saturated solution of potassium sulfate.

3. In the process of producing artificial silk, the step which consists of treating collodion with non-volatile chrysalis oil.

In testimony whereof I affix my signature in presence of two witnesses.

KAZUTA KISHI.

Witnesses:
HARUTADA YASUMURA,
GENJI KURIBARA.